United States Patent [19]

Schwan

[11] 3,862,945

[45] Jan. 28, 1975

[54] 1,2,3,4,6,7,8,9-OCTAHYDRO-3,8-DIMETH-YL-4,9-DIPHENYLPYRIDO (3,4-G)ISOQUININOLINE DIHYDROCHLORIDE

[75] Inventor: Thomas J. Schwan, Norwich, N.Y.

[73] Assignee: Morton-Norwich Products, Inc., Norwich, N.Y.

[22] Filed: Oct. 23, 1973

[21] Appl. No.: 408,735

[52] U.S. Cl. ...... 260/286 R, 260/288 R, 260/288 P, 260/570.5 P, 424/258
[51] Int. Cl. ........................................... C07d 39/00
[58] Field of Search .................... 260/288 R, 288 P

[56] References Cited
UNITED STATES PATENTS
3,329,681   7/1967   Dwyer ............................ 260/288 P OTHER PUBLICATIONS
Chem. Abstracts; 8th Coll. p. 228825 col. 3.

Primary Examiner—Donald G. Daus
Assistant Examiner—Mary C. Vaughn
Attorney, Agent, or Firm—Anthony J. Franze

[57] ABSTRACT
The title compound is useful as an anthelmintic.

1 Claim, No Drawings

1,2,3,4,6,7,8,9-OCTAHYDRO-3,8-DIMETHYL-4,9-DIPHENYLPYRIDO (3,4-G)ISOQUININOLINE DIHYDROCHLORIDE

This invention is concerned with the compound 1,2,3,4,6,7,8,9-octahydro 3,8-dimethyl-4,9-diphenylpyrido [3,4-g]isoquinoline dihydrochloride. This compound possesses anthelmintic properties. When administered perorally to mice harboring *Hymenolepis nana* in a dose of 100 mg/kg b.i.d. for three days, a 77% reduction in worm population is secured.

In order that this invention may be available to and understood by those skilled in the art, the following method for its preparation is set forth:

A. N,N'-bis (1-Hydroxy-1-phenyl-2-propyl)-p-xylene-$\alpha,\alpha'$-diamine

A 2 l. 3 neck flask was charged with 2-amino-1-phenyl-1-propanol hydrochloride (149.6 g, 0.8 mole), terephthaldicarboxaldehyde (53.6 g, 0.4 mole), triethylamine (80.8 g, 0.8 mole) and 700 mls of methanol. The solution was stirred at ambient temperature for 20 mins. then cooled below 30° and held at 30° through the addition of sodium borohydride (30 g, 0.8 mole). After the addition was completed the mixture was stirred at room temperature for 2 hours and then concentrated to dryness. The residue was partitioned between 1,500 ml. water and 1,500 ml. chloroform. The combined chloroform extracts were dried (MgSO$_4$), and concentrated to dryness in vacuo yielding 160 g (99%).

B. 1,2,3,4,6,7,8,9-Octahydro-3,8-dimethyl-4,9-diphenylpyrido [3,4-g]isoquinoline Dihydrochloride To 960 gms of polyphosphoric acid was introduced A (160 g. 0.395 mole). After cautiously raising the temperature to 80° (steam bath) the reaction became exothermic and the temperature rose to 130° before subsiding. Following continuous stirring overnight at ambient temperature the resulting viscous oil was poured into 6 l of cold tap water and the mixture was made basic with 1 l. of 50% potassium hydroxide producing 156 gms (90%) of white solid. The hydrochloride was prepared by suspending the free base in hot methanol with subsequent addition of methanolic hydrogen chloride to yield 58 g (33%), m.p. 344° (dec.).

Anal. Calcd. for $C_{26}H_{28}N_2 \cdot HCl$: C, 70.74; H, 6.85; N, 6.35. Found: C, 71.03; H, 6.99; N, 6.17.

What is claimed:

1. 1,2,3,4,6,7,8,9-Octahydro-3,8-dimethyl-4,9-diphenylpyrido [3,4-g]isoquinoline dihydrochloride.

* * * * *